(12) United States Patent
Shaw (10) Patent No.: US 7,299,291 B1
(45) Date of Patent: Nov. 20, 2007

(54) CLIENT-SIDE METHOD FOR IDENTIFYING AN OPTIMUM SERVER

(75) Inventor: David M. Shaw, Newton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 482 days.

(21) Appl. No.: 09/859,708

(22) Filed: May 17, 2001

Related U.S. Application Data

(60) Provisional application No. 60/205,636, filed on May 18, 2000.

(51) Int. Cl.
*G06F 15/16* (2006.01)
(52) U.S. Cl. .................. 709/231; 709/203; 709/219; 709/222; 709/225; 709/227; 709/234
(58) Field of Classification Search ................ 709/223, 709/225, 231
See application file for complete search history.

(56) References Cited

U.S. PATENT DOCUMENTS

| | | | |
|---|---|---|---|
| 6,003,030 A | | 12/1999 | Kenner et al. |
| 6,078,953 A | * | 6/2000 | Vaid et al. .................. 709/223 |
| 6,108,703 A | | 8/2000 | Leighton et al. |
| 6,112,239 A | | 8/2000 | Kenner et al. |
| 6,134,588 A | * | 10/2000 | Guenthner et al. ......... 709/226 |
| 6,141,759 A | * | 10/2000 | Braddy ........................ 713/201 |
| 6,154,744 A | | 11/2000 | Kenner et al. |
| 6,195,680 B1 | * | 2/2001 | Goldszmidt et al. ........ 709/203 |
| 6,292,834 B1 | * | 9/2001 | Ravi et al. .................. 709/233 |
| 6,351,775 B1 | * | 2/2002 | Yu .............................. 709/238 |
| 6,377,996 B1 | * | 4/2002 | Lumelsky et al. .......... 709/231 |
| 6,421,726 B1 | | 7/2002 | Kenner et al. |
| 6,546,421 B1 | * | 4/2003 | Wynblatt et al. ........... 709/225 |
| 6,665,726 B1 | | 12/2003 | Leighton et al. |

OTHER PUBLICATIONS

Challenger, et al. "A scalable and highly available system for serving dynamic data at frequently accessed web sites." 1998. ACM/IEEE Conference on Supercomputing. Published by IEEE.*

(Continued)

*Primary Examiner*—Jason Cardone
*Assistant Examiner*—Nicholas R Taylor
(74) *Attorney, Agent, or Firm*—David H. Judson (57) ABSTRACT

A client player performs a query to a nameserver against a network map of Internet traffic conditions. The query is made asking for a particular service (e.g., RTSP) via a particular protocol (TCP) in a particular domain. In response, the nameserver returns a set of one or more tokens, with each token defining a machine or, in the preferred embodiment, a group of machines, from which the player should seek to obtain the stream. The player may then optionally perform one or more tests to determine which of a set of servers provides a best quality of service for the stream. That server is then used to retrieve the stream. Periodically, the client player code repeats the query during stream playback to determine whether there is a better source for the stream. If a better source exists, the player performs a switch to the better stream source "on the fly" if appropriate to maintain and/or enhance the quality of service. Preferably, the client player publishes data identifying why it selected a particular server, and such data may be used to augment the network map used for subsequent request routing determinations.

14 Claims, 2 Drawing Sheets

OTHER PUBLICATIONS

Min, et al. "A load balancing algorithm for a distributed multimedia game server architecture." Jun. 1999. IEEE International Conference on Multimedia Computing and Systems of 1999.*

Crowcroft, Jon. "The Real Time Stream Protocol—RTSP." Nov. 1998. http://www.cs.ucl.ac.uk/staff/jon/mmbook/book/node314.html.*

Gulbrandsen, et al. "RFC 2782: A DNS RR for specifying the location of services (DNS SRV)." Feb. 2000. Network Working Group, Request for Comments #2782.*

A. Gulbrandsen et al., RFC 2052 "A DNS RR for specifying the location of services (DNS SRV)" (Oct. 1996).

* cited by examiner

CLIENT-SIDE METHOD FOR IDENTIFYING AN OPTIMUM SERVER

RELATED APPLICATION

This application is based on and claims priority from provisional application Ser. No. 60/205,636, filed May 18, 2000, and assigned to the assignee of this application.

BACKGROUND OF THE INVENTION

1. Technical Field

The present invention relates generally to high-performance, fault-tolerant content delivery in a content delivery network (CDN).

2. Description of the Related Art

Streaming media is a type of Internet content that has the important characteristic of being able to be played while still in the process of being downloaded. A client can play the first packet of the stream, and decompress the second, while receiving the third. Thus, an end user can start enjoying the multimedia without waiting to the end of transmission. Streaming is very useful for delivering media because media files tend to be large particularly as the duration of the programming increases. Indeed, for live events, the file size is, in effect, infinite. To view a media file that is not streamed, users must first download the file to a local hard disk—which may take minutes or even hours—and then open the file with player software that is compatible with the file format. To view streaming media, the user's browser opens player software, which buffers the file for a few seconds and then plays the file while simultaneously downloading it. Unlike software downloads, most streaming media files are not stored locally on a user's hard disk. Once the bits representing content are used, the player typically discards them.

Streaming media quality varies widely according to the type of media being delivered, the speed of the user's Internet connection, network conditions, the bit rate at which the content is encoded, and the format used. In general, streaming audio can be FM quality, but, given typical bandwidth constraints, streaming video is poor by TV standards, with smaller screens, lower resolution, and fewer frames per second. The source for streaming media can be just about any form of media, including VHS or Beta format tapes, audio cassettes, DAT, MPEG video, MP3 audio, AVI, and the like. Prior to streaming, the content must first be encoded, a process which accomplishes four things: conversion of the content from analog to digital form, if necessary; creation of a file in the format recognized by the streaming media server and player; compression of the file to maximize the richness of the content that can be delivered in real-time given limited bandwidth; and, establishing the bit rate at which the media is to be delivered. Content owners typically choose to encode media at multiple rates so that users with fast connections get as good an experience as possible but users with slow connections can also access the content.

Non-streaming content is standards-based in the sense that the server and client software developed by different vendors, such as Apache server, Microsoft Internet Explorer, Netscape Communicator, and the like, generally work well together. Streaming media, however, usually relies on proprietary server and client software. The server, client, production and encoding tools developed by a streaming software vendor are collectively referred to as a format. Streaming media encoded in a particular format must be served by that format's media server and replayed by that format's client. Streaming media clients are often called players, and typically they exist as plug-ins to Web browsers. Streaming media clients are also often capable of playing standards-based non-streaming media files, such as WAV or AVI.

The three major streaming media formats in use today are: RealNetworks RealSystem G2, Microsoft Windows Media Technologies ("WMT"), and Apple QuickTime. RealSystem G2 handles all media types including audio, video, animation, and still images and text. RealSystem G2 and QuickTime support SMIL, an XML-based language that allows the content provider to time and position media within the player window. To deliver the media in real time Real and QuickTime use RTSP, the Real Time Streaming Protocol. RTSP is an application-level protocol designed to work with lower-level protocols like RTP (Realtime Transport Protocol) and RSVP (Resource Reservation Protocol) to provide a complete streaming service over the Internet. To stream in WMT's Advanced Streaming Format, content providers typically must have Microsoft NT 4 Server installed. WMT does not support SMIL or RTSP but has its own protocol that it calls HTML+Time. Apple QuickTime recently has added the capability to serve streaming media. QuickTime can support a number of formats including VR, 3D, Flash, and MP3.

From a network perspective, traditional approaches to streaming Internet content involve transmitting a streaming signal from a source to a device known as a splitter (or repeater, reflector or mirror), which, in turn, replicates the source signal into multiple signals. Each of the multiple signals is the same, and each is sent on to a different destination. By cascading splitters in a tree-like fashion, a single source stream can be replicated into thousands or more identical copies. In this manner, a large number of viewers on the Internet can receive the same streaming signal simultaneously It is also known in the art to deliver streaming media (and HTTP-based Web content) using a content delivery network (CDN). A CDN is a network of geographically distributed content delivery nodes that are arranged for efficient delivery of digital content (e.g., Web content, streaming media and applications) on behalf of third party content providers. A request from a requesting end user for given content is directed to a "best" replica, where "best" usually means that the item is served to the client quickly compared to the time it would take to fetch it from the content provider origin server.

Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN service that provides web content and media streaming is provided by Akamai Technologies, Inc. of Cambridge, Mass.

CDNs may use content modification to tag content provider content for delivery. Content modification enables a content provider to take direct control over request-routing without the need for specific switching devices or directory services between the requesting clients and the origin server. Typically, content objects are made up of a basic structure that includes references to additional, embedded content objects. Most web pages, for example, consist of an HTML document that contains plain text together with some embedded objects, such as .gif or .jpg images. The embedded objects are referenced using embedded HTML directives. A similar scheme is used for some types of streaming content which, for example, may be embedded within an SMIL document. Embedded HTML or SMIL directives tell the client to fetch embedded objects from the origin server. Using a CDN content modification scheme, a content provider can modify references to embedded objects so that the client is told to fetch an embedded object from the best surrogate (instead of from the origin server).

In operation, when a client makes a request for an object that is being served from the CDN, an optimal or "best" edge-based content server is identified. The client browser then makes a request for the content from that server. When the requested object is not available from the identified server, the object may be retrieved from another CDN content server or, failing that, from the origin server.

A "best" content server for a particular client may not remain that way for a given time period. In the context of streaming content delivery, for example, the notion of "best" can change very quickly given the relatively large size of most streams (and the near-infinite size of all live streams). Thus, in many cases, the "best" server for a given client player receiving a given stream is likely to change before the stream is finished.

It would be desirable to enable a client player to identify a best server dynamically and, when appropriate, to enable the player to selectively switch from one server to another during the process of downloading and outputting a given stream or other large file.

BRIEF SUMMARY OF THE INVENTION

A client machine includes a media player provisioned to perform a query to a CDNSP nameserver having a network map of Internet traffic conditions. In a preferred embodiment, the query is a DNS SRV lookup and includes an identification of the client player. The query is made asking for a particular service (e.g., RTSP) via a particular protocol (TCP) in a particular CDNSP domain. In response, the nameserver returns a set of one or more tokens, with each token defining a machine or, in the preferred embodiment, a group of machines, from which the player should seek to obtain given content (e.g., a stream). The player may then optionally perform one or more tests to determine which one of a set of returned servers provides a best quality of service for the content delivery. That server is then used to retrieve the content. Periodically, the client player code repeats the DNS SRV query during playback to determine whether there is a better source for the stream. If so, the player is controlled to switch to the better stream source "on the fly" if appropriate to maintain and/or enhance the quality of service. Preferably, the client player publishes data back to the CDNSP identifying the results that were obtained during the testing process. This data provides the CDNSP with feedback regarding why the client player selected a particular server. Such data may then be used to augment the network map that is used by the CDNSP for subsequent request routing determinations.

The foregoing has outlined some of the more pertinent features of the present invention. These features should be construed to be merely illustrative. Many other beneficial results can be attained by applying the disclosed invention in a different manner or by modifying the invention as will be described. Accordingly, other features and a fuller understanding of the invention may be had by referring to the following Detailed Description of the Preferred Embodiment.

DETAILED DESCRIPTION OF THE PREFERRED EMBODIMENT

Figure 1:
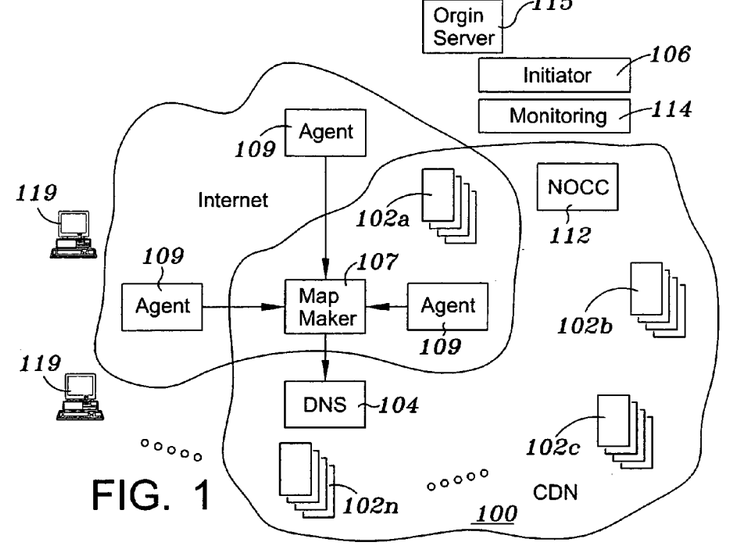
FIG. 1 is a block diagram of a known content delivery network in which the present invention may be implemented.

FIG. 1 is a diagram showing an illustrative content delivery service in which the present invention may be implemented. The invention may likewise be implemented with other known or later-designed or built content delivery services or systems. In the illustrative embodiment, the content delivery service comprises a preferably global content delivery network (CDN) 100 of content delivery server regions 102*a-n*, a domain name service (DNS) system 104, and a content modification or "initiator" tool 106 that allows content to be tagged for inclusion on the network. DNS system 104 receives network mapping data from a map maker 107, which receives inputs from monitoring agents 109 distributed throughout the Internet. Agents typically perform various tests and monitor traffic conditions to identify Internet congestion problems. The map maker 107 takes the data generated from the agents and generates one or more maps detailing Internet traffic conditions. Generally, the content delivery service allows the network of content delivery server regions 102*a-n* to serve a large number of clients efficiently. Each region may include one or more content servers, with multiple content servers typically sharing a local area network (LAN) backbone. Although not meant to be limiting, a typical server is an Intel Pentium-based caching appliance running the Linux operating system with a large amount of RAM and disk storage. As also seen in FIG. 1, the content delivery service may include a network operations control center (NOCC) 112 for monitoring the network to ensure that key processes are running, systems have not exceeded capacity, and that subsets of content servers (the so-called CDN regions 102) are interacting properly. A content provider operates an origin server (or server farm) 115 from which requesting end users 119 would normally access the content provider's Web site via the Internet. Use of the CDN avoids transit over the Internet for selected content as described below. The content provider may also have access to a monitoring suite 114 that includes tools for both real-time and historic analysis of customer data. One tool is a traffic analyzer that provides multiple monitoring views that enable quick access to network and customer-specific traffic information. A reporter allows for viewing of historical data. A billing tool may be used to generate appropriate billing information for the content provider, who typically pays for the service as a function of the amount of content delivered by the CDN.

High-performance content delivery is provided by directing requests for web objects (e.g., graphics, images, streaming media, HTML and the like) to the content delivery service network. In one known technique, known as Akamai FreeFlow Streaming content delivery, content is first tagged for delivery by the tool 106, which, for example, may be executed by a content provider at the content provider's web site 115. For streaming content, the initiator tool 106 converts URLs that refer to streaming content to modified resource locators, called ARLs for convenience, so that requests for such media are served preferentially from the CDN instead of the origin server. For example, the tool prepends each streaming URL with a string containing a CDN domain and, optionally, additional control information. For the URL rtsp://www.foo.com/movie.mov, for example, the corresponding ARLs may look like as follows:

Live or Broadcast:
WMT:   mms://a9.m.akastream.net/ . . . (control info)/reflector:35001
Real:  rtsp://a9.r.akareal.net/live/ . . . (control info)/reflector:35001
QT:    rtsp://a9.q.kamai.net/ . . . (control info)/www.mysite.com/movie/sdp Of course, the above formats are merely illustrative. When an Internet user visit's a CDN customer's site (e.g., origin server 115) and selects on a link to view or hear streaming media, the user's system resolves the domain in the ARL to an IP address. In particular, because the content has been tagged for delivery by the CDN, the URL modification, transparent to the user, cues the Internet's standard Domain Name Service (DNS) to query a CDN name server (or hierarchy of name servers) 104 to identify the appropriate media server from which to obtain the stream. The CDN typically implements a request-routing mechanism (e.g., under the control of maps generated from the monitoring agents 109 and map maker 107) to identify an optimal server for each user at a given moment in time. Because each user is served from the optimal streaming server, preferably based on real-time Internet conditions, streaming media content is served reliably and with the least possible packet loss and, thus, the best possible quality. Further details of a DNS-based request-routing mechanism are described in U.S. Pat. No. 6,108,703, which is incorporated herein by reference.

Figure 2:
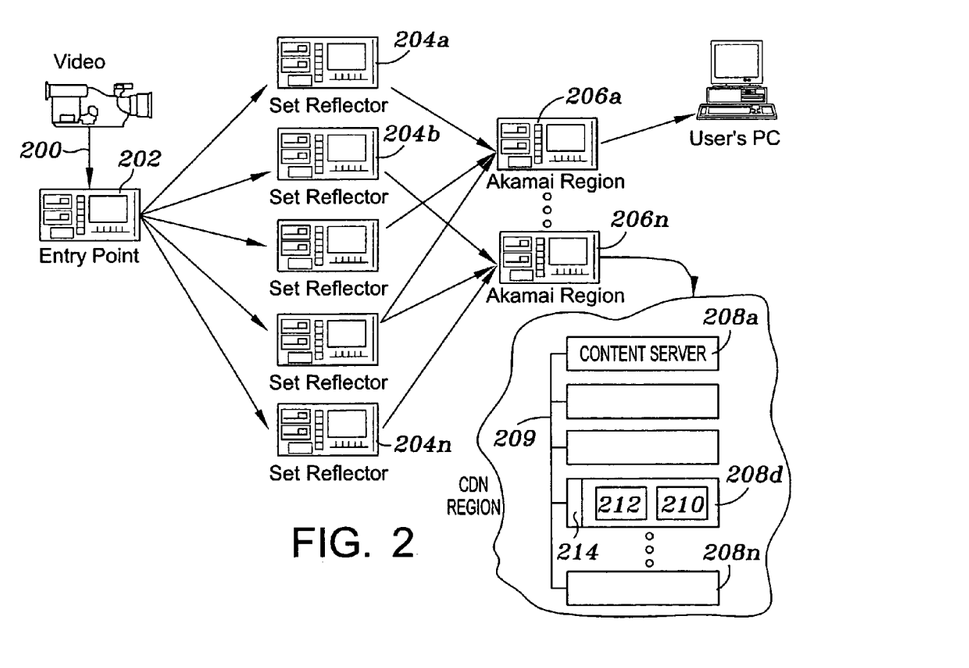
FIG. 2 is a simplified diagram illustrating how live streaming can be further enhanced by having the CDN send multiple copies of the same stream over different routes from a CDN entry point to the optimal streaming server at the edge of the Internet.

As described in U.S. Pat. No. 6,665,726, which is also incorporated herein by reference, live streaming can be further enhanced by having the CDN send multiple copies of the same stream over different routes from a CDN entry point to the optimal streaming server at the edge of the Internet. These copies are then combined to form one complete, original-quality stream, which is sent from the streaming server to the end users. FIG. 2 illustrates this process in more detail. A broadcast stream 200 is sent to a CDN entry point 202. An entry point, for example, comprises two servers (for redundancy), and each server can handle many streams from multiple content providers. Once the entry point receives the stream, it rebroadcasts copies of the stream to set reflectors 204a-n. The streams are multiplexed and delivered to the set reflectors preferably via UDP (e.g., WMT encapsulated in RTSP encapsulated in UDP over IP). These set reflectors are preferably diverse from a network and geographic standpoint (e.g., at diverse Internet backbone data centers) to ensure fault tolerance. Each set reflector, in turn, rebroadcasts its copy of the stream to each subscribing region, e.g., region 206d, of a set of regions 206a-n. A subscribing region 206d is a CDN region that contains one or more streaming edge nodes 208a-n to which user(s) have been routed by the CDN request-routing mechanism. In other words, set reflectors send their streams to every edge region where they are needed. A CDN region, in this example, includes a set of edge nodes connected by a common backbone 209, e.g., a local area network (LAN). Typically, an edge node, e.g., node 208d, comprises a streaming server 212 and it may include a cache 210. A representative server runs an Intel processor, the Linux operating system and a Real Media or QuickTime Server. For Windows-based platforms, a representative server runs an Intel processor, Windows NT or 2000, and a Windows Media Server. As will be described, the edge node also runs control programs 214 to facilitate the inventive subscription mechanism.

Each subscribing region, then, simultaneously receives multiple copies of the streamed content. These copies have been sent via separate routes over the Internet, so congestion resulting in dropped packets is unlikely to impact each copy of the stream equally. As described in U.S. Pat. No. 6,665, 726, each region preferably has a mechanism to recreate in real time an original version of the stream as sent to the entry point. In this way, the technique compensates for the inherently faulty Internet and inherently lossy UDP transport protocol. The reassembly mechanism within each region makes the original, verbatim stream available to every streaming media server within that region. When a user clicks on a CDN-tagged stream, the stream is delivered from the optimal edge node (and, in particular, that node's streaming media server) identified by the CDN's request-routing mechanism. If the CDN maps a user to a node in a region which has not subscribed to that broadcast stream (which, for example, is true for the first connection served from that region), the region automatically notifies the set reflectors and subscribes to that stream.

A "best" content server for a particular client may not remain that way for a given time period. In particular, the notion of "best" can change very quickly given the relatively large size of most streams (and the near-infinite size of all live streams). Thus, in many cases, the "best" server for a given client player receiving a given stream is likely to change before the stream is finished. The present invention provides a method for enabling a client player to identify a best server dynamically and, in addition, to selectively switch to that server to receive the stream or portions thereof. In one embodiment, the present invention is implemented a streaming media client or player, which may be a plug-in to a web browser. The streaming media client is receiving a media stream from a given server, as generally described above. The invention enables the browser and, in particular, the media client, to identify an optimum streaming server for the stream in the first instance and, if appropriate, to selectively switch from a first server to an optimum streaming server "on the fly" so that it continues to receive the best possible service.

Figure 3:
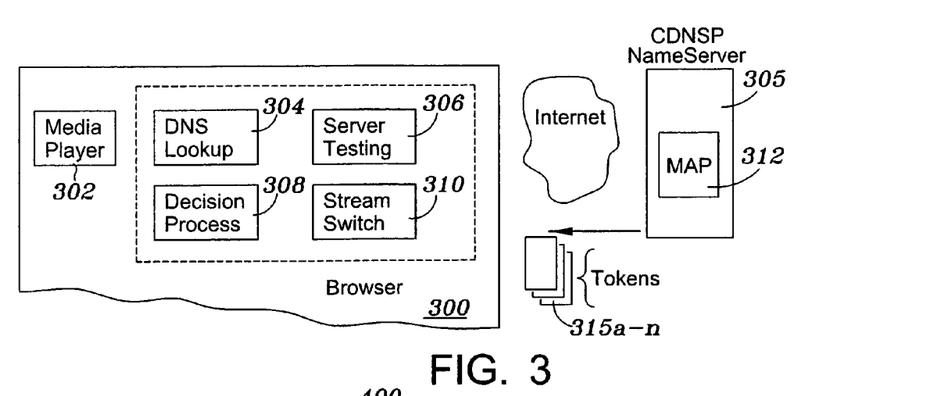
FIG. 3 illustrates a representative client browser having a streaming media client player that is enhanced to include the functionality of the present invention.

FIG. 3 illustrates a representative client browser 300 having a streaming media client player (e.g., Real Player, Apple QuickTime Player, Windows Media Player, or the like) 302 that is enhanced according to the present invention. In particular, the streaming media client player includes or has associated therewith given code (a series of computer program instructions) for use in providing the inventive functionality. In a representative embodiment, this code comprises several processes, namely, a DNS lookup process 304, a server testing process 306, a decision process 308, and a stream switch process 310. These processes are shown as being discrete for illustrative purposes only, as the functionality described below for each of the processes can be integrated into one or more programs, processes, execution threads, applets, or the like. In one embodiment, the functions are built into the browser software directly, in another embodiment one or more of these functions are built into a plug-in to the browser software, in yet another embodiment one or more of these functions are provided in standalone code executable in the browser or elsewhere on the client. The particular implementation used is not critical to the operation of the invention.

With reference to the illustrative FIG. 3 embodiment, the DNS lookup process 304 is operative prior to and/or during receipt of a given stream for performing a given DNS lookup at a a nameserver 305 against a map 312 of current Internet traffic conditions maintained at that nameserver, for example, by a CDN service provider. In one particular embodiment, the lookup process performs a DNS SRV lookup. The query preferably comprises given information, e.g., the IP address of the client player, the IP address of the player's local nameserver, and the media type requested. DNS SRV is a known protocol defined in RFC 2052 or RFC 2782, and this protocol enables administrators to designate some hosts as primary servers for a service and others as backups. In this embodiment, a DNS SRV query is made asking for a particular service (in this case, RTSP) via a particular protocol (TCP) in a particular domain. The nameserver responds to the query with a set of tokens 315a-n. Each token 315 provides a distinct answer to the query and defines a machine or, in the preferred embodiment, a group of machines, from which the client should seek to obtain the stream (identified by the URL). The nameserver response preferably also includes priority information (e.g., a ranking) and, optionally, weighting information for each token. The nameserver also associates and stores the requesting player's IP address and the response data generated as a result of the query.

As will be illustrated in more detail below, preferably each token is a construct that can be used by the requesting client browser to find a preferred machine within a given CDN region. To give an example, the first token may be of the form "y5q.kamai.net" where the "kamai.net" domain identifies the CDNSP domain and the "y{x}q" portion is, in effect, an instruction to an CDNSP nameserver to identify a set of lower level nameservers in the specified CDN region number 5. The lower level nameservers would then be queried to identify a particular "best" server. Of course, the token itself may point directly to the lower level nameservers or to a particular server within a given region. Thus, as can be seen the client player initiates a query to a first or top level nameserver (the DNS SRV name server) and receives, in response, one or more tokens. A given token can then be passed back by the client player to a second or lower level nameserver to obtain a list of servers within a given CDN region from which the desired stream may be obtained. By passing the client player IP address in the initial request, the top level nameserver can provide more accurate mapping of the request to a CDN region best able to service the request.

Returning to FIG. 3, the server testing process 306 responds to the returned token information or to information obtained from further processing of the token (as in the "y5q" example described above), and may perform one or more tests to help identify a best server. Server testing is not required, however, although it is desirable provided the additional bandwidth required by the testing is not prohibitive. In an illustrative embodiment, the server testing process has been provided with a list of servers to test. It then contacts each one, e.g., by using the SRV protocol, which specifies a well-defined ordering scheme, although the player can use any scheme or simply try all servers at level n before trying n+1. Upon contacting a server, the process issues a status request to get information about the capabilities of the server. One convenient technique is to use an RTSP "OPTIONS" command. The response from each server will be a static text string. The request-response is timed by the server testing process, which then determines the "best" server (e.g., usually the one providing the fastest response). In this way, the server testing may be used to "fine tune" the server chosen by the CDN DNS request routing system with an additional piece of information, namely, the actual pipe the client is using for the connection.

Once the fastest responding server is selected, the client connects to it and sends a usual command, e.g., the RTSP DESCRIBE command. According to the invention, the server testing process preferably also builds and sends an extra header that contains the IP address of the machine(s) tested, the timings of the OPTIONS experiment(s), and other data. The following is a representative data structure:

Construction of the X-CDNSP-Times: header
X-CDNSP-Times: {version} {{ip} {region} {time}}...

| | |
|---|---|
| X-CDNSP-Times | "X-" is to show this is a non standard header |
| : | Colon & space (separator) |
| {version} | The version of this protocol - currently 1 |
| {ip} | The IP address of the machine tested |
| {region} | The region the IP address came from (e.g. the number after the y flag) |
| {time} | The time in milliseconds for the OPTIONS response to come back |

Preferably, the header is passed out-of-band to an appropriate CDNSP process that is used to generate one or more DNS request routing maps, e.g., nameserver map 312. That process may also receive the DNS SRV response and the requesting IP address of the client player that initiated the query. Such "feedback" provides significant value to users of the system (both SRV-enabled clients and other clients) by enhancing the accuracy of subsequent region or machine assignments when later requests are resolved against the modified map 312. In particular, one of ordinary skill in the art will appreciate that the best analysis of a given routing decision with respect to a given client is made by that client, as opposed to some proxy for that client (e.g., the client's local name server). The header illustrated above may include information that describes the specific region/machine that the given client selected as the "best" and the data underlying that decision. This information can then be used to bias the request routing decisions in the map 312 for future requests made by this or other clients. As more clients use the system and provide such feedback, the request routing provided by the map becomes more and more accurate as, in effect, subsequent decisions can be based on the additional intelligence about how well the request routing was performed for the earlier requests.

As noted above, typically the fastest responding server to the OPTIONS test will be the best server to stream the requested data to the user. This also gives the system a chance to re-assign the stream, e.g., via a redirect message. If the fastest responding server is indeed the correct server to stream from, then the X-CDNSP-Times header can be ignored by the server. Another function provided by the present invention is the ability of the client player (namely, the code running in that player) to identify a "better" source for a stream being received and to switch to that source "on the fly," i.e., while the stream is being received and rendered on the client. The decision process 308 is used to determine whether the player should switch servers mid-stream. Because it is likely there will be some cost to switching (e.g., perhaps a short interruption in service), a client should only switch servers if it is not getting an acceptable stream from the first server. The decision process 308 makes a decision regarding whether the stream being received is "acceptable," e.g., a stream that is not currently being thinned by the server, or some other metric. As used herein, "acceptable" does not necessarily mean acceptable quality. It can also mean acceptable from a stream management point of view. For example, the client could be actually told by the server that the stream is unacceptable, e.g., if the server knows it is to be taken down soon (for a software update or other servicing). It could also declare a stream unacceptable if new advertising or newer content (e.g., a fast breaking news story) becomes available. These examples, of course, are merely representative.

If the decision process determines that another server is a better source than a current source, control is passed to the stream switch process 310, which is the process that makes the actual switch from one server to another. The particular technique used for switching from a first server to a second server typically is media type-dependent and any convenient technique may be used. Thus, for example, assume a stream being received has a length of 5:00 minutes and the client player is processing the stream from a first server at an offset of 2:35 when a decision is made to change to a second server. The stream switch process 310 may then cause the second server to begin sending the stream at an offset of 2:45 and, at the same time, send appropriate instructions to terminate the stream from the first server. The stream switch process thus has the capability of picking the server it likes "least" and instructing that server to cease transmission at a given point. In another alternative, once the stream switch process 310 decides to make a switch, it creates an internal buffer and causes that buffer to be filled with advance portions of the stream (e.g., by instructing the first server to deliver packets faster than those packets can be rendered or by instructing the player to slow down the rendering process). The switch process 310 then causes the first server to cease transmission and request that the new server begin the stream at a given offset. At this point, the pre-cached data in the buffer is rendered until the given offset is reached and the new data is received. As appropriate, the stream switch process includes the capability to match data packets from first and second servers to enable a substantially seamless switch to the new stream source. Voice streams can be synched before a switch by snipping out and putting in minute bits of silence between words. Of course, the above are merely exemplary as any convenient switching technique may be implemented.

Figure 4:
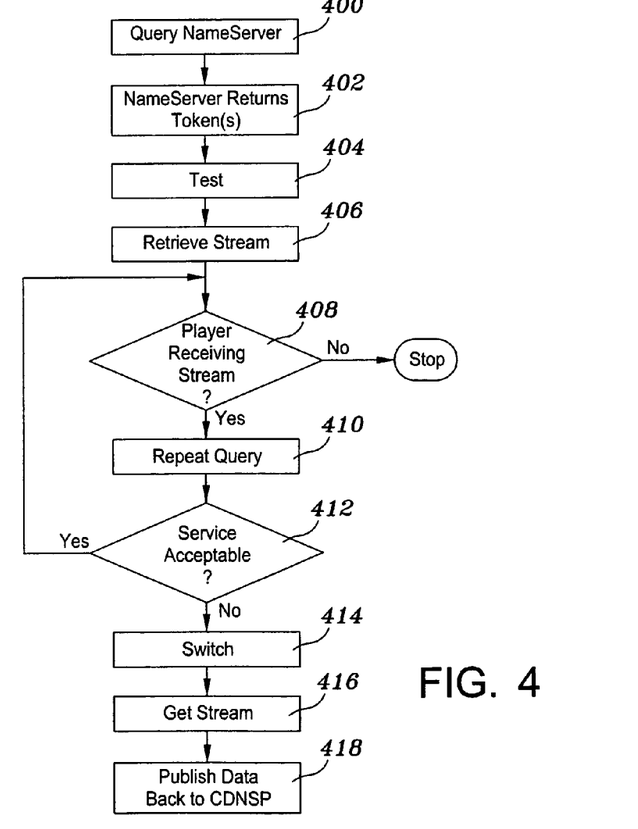
FIG. 4 is a simplified flowchart illustrating the operation of the client player in a representative embodiment.

Thus, as summarized in the flowchart of FIG. 4, the client player provisioned according to the invention performs a query to a nameserver against a CDNSP network map. This is step 400. The query is made asking for a particular service (e.g., RTSP) via a particular protocol (TCP) in a particular domain. In response, at step 402, the nameserver returns a set of one or more tokens, with each token defining a machine or, in the preferred embodiment, a group of machines, from which the player should seek to obtain the stream. The player may then optionally perform one or more tests to determine which of a set of servers provides a best quality of service for the stream. This is step 404. That server is then used to retrieve the stream, which is step 406. At step 408, a test is performed to determine whether the client player is still receiving the stream. If not, the routine ends. If, however, the client player is still receiving the stream, the routine continues at step 410 with the client player code repeating the DNS SRV query during playback to determine whether there is a better source for the stream. The "period" over which the query is repeated is variable and is dependent on the bandwidth available between the client and the network. For a live stream, a query/minute may be a desirable frequency. A shorter frequency (e.g., every few seconds) may be desirable for a broadband connection). At step 412, a test is performed to determine whether the client player is receiving acceptable service from the existing source. If so, the routine returns to step 408 and repeats the process at a given frequency. If the outcome of the test at step 412 indicates that the stream source is unacceptable, the routine continues at step 414 to initiate the switch to the "better" stream source. As noted above, preferably this switch is carried out "on the fly" as appropriate to maintain and/or enhance the quality of service. Thereafter, at step 416, the client player continues to obtain the remainder of the stream from the new source. Of course, the "best" source may be changed again if the circumstances warrant. In a preferred embodiment, and as indicated at step 418, the client player publishes data back to the CDNSP identifying the tests it ran to determine the best server. Such data may then be used to augment the network map that is used for subsequent request routing determinations.

The following is an illustrative embodiment for an Apple QuickTime media player.

| Construction of a SRV Query |  |
|---|---|
| A preferred SRV construction method is set forth below. |  |
| _a{Serial Number}-{IP address}. tcp.srv.kamai.net. |  |
| _a{Serial Number} | This is the serial number field (including the "a") from a CDNSP-specific hostname (a hostname pointing to the CDN) with an underscore prepended. A serial number identifies a virtual content bucket on a CDN content server that may host the content |
| - | Hyphen (separator) |
| {IP Address} | The IP address of the player written as a four byte unsigned integer in network byte order |
| . | Dot (separator) |
| _tcp | Required by REC 2782 - not applicable here |
| . | Dot (separator) |
| Srv | Specifies to the CDNSP DNS system to serve this request from a different set of servers |
| . | Dot (separator) |
| Kamai.net | Any CDNSP DNS domain name, with this particular name being merely representative |

Note the use of the underscore ("_") character in the full SRV name. This is not an improper syntax as underscores are only illegal in hostnames, and an SRV query is not considered a hostname. Although not required, preferably there are several SRV servers associated with the "srv.kamai.net" domain to spread out the load and ensure there is no single point of failure. The passing of the player's IP address is optional but desirable, and this operation may be set as a configuration option in the player. The SRV server must therefore be able to handle responses with and without the IP address supplied, although preferably the address is used. If the IP address is not passed, then the SRV server should treat the address of querying name server as the IP address of the client.

The SRV nameserver that receives this query then has several important pieces of information:
1. The IP address of the player (optional, but desirable);
2. The IP address of the player's nameserver; and
3. The type of media being requested (e.g. "q"=QuickTime).

Based on this information, and in a preferred embodiment, the SRV server then performs the following steps
1. Calculates a best CDNSP region to direct the player towards using the three (3) pieces of information given above, in combination with a network map; and
2. Returns a reply to the client comprising an identification of this region, as well as several other regions that are possible contenders if the first region does not work out well.

As an example, assume that a user at IP address 17.37.117.209 is requesting a stream from the host a40.q.kamai.net. The SRV query might then be of the following representative format:

_a40-287667665._tcp.srv.kamai.net

Based on the then-current network map, assume that the best region is region 5, followed by region 3, and then region 2 and region 7 at equal ability. In such case, the SRV name server will return the following representative data (with the particular references being merely exemplary):

| Ranking | Weighting | Port to use | Hostname |
|---------|-----------|-------------|----------|
| 1 | 0 | 554 | a40.y5q.kamai.net. |
| 2 | 0 | 554 | a40.y3q.kamai.net. |
| 3 | 0 | 554 | a40.y2q.kamai.net. |
| 3 | 0 | 554 | a40.y7q.kamai.net. |

| SRV Field Meanings | |
|---|---|
| Ranking | Ranking order, with low numbers tried before high |
| Weighting | N/A |
| Port | The port to which the connection should be mae. For an Apple QuickTime player, for example, this will always be 554. This value may be useful at some point if a different set of servers (on a different port) are set up |
| Hostname | The fully-qualified domain name of the server to contact. The y{x}q entry in the Hostname field is an instruction to a CDNSP top-level nameserver to return a set of low-level nameservers in the specified region. This will result in a the best server in that specific region being returned when the name is looked up by the player. |

Behavior of the player after recieving a SRV response

Once the client (and, in particular, the client player) receives this list of servers, it contacts each one and requests an "OPTIONS" from each one. The response from each server is timed, and the "fastest" server may be selected as the "best" server from which to proceed. Once the fastest responding server is selected, the client connects to it and sends the usual DESCRIBE command. In addition to this, the X-CDNSP-Times: header preferably is added containing the timings of the OPTIONS experiment.

After the Connection is Established

At this point, the client is speaking to the best server. As noted above, the client player may selectively switch from one stream to another, either seamlessly or with as minimal of a break as possible. With that ability, if a client does a SRV lookup periodically, it can learn which set of servers is currently best and switch to a server that is better than the one it is currently receiving the stream from.

In combination with the inventive method, a given server itself can elect at any time to send the client to a better place via the RTSP REDIRECT command. This command allows for a redirect to happen at a particular time count, which should allow the player to resume the stream where it left off elsewhere without missing any data.

As noted above, when the client player sends a query to the nameserver, that server performs a lookup against a map of current Internet traffic conditions. The CDNSP generates the map in any convenient manner. The following is a representative technique, which should not be taken by way of limitation. To prepare for generating this map, mapping agents (e.g., one per CDN server region) may collect the following information: (a) IP blocks (a list of IP address blocks currently in use in the Internet), (b) load (per-IP block measurements of the amount of web load currently being handled by the CDN, (c) communication costs (e.g., a table listing the measured communication cost for each {IP block, CDN server region} pair, and (d) capacity (e.g., an aggregate server and network capacity of each CDN server region).

In particular, a combination of different methods may be used to put together the list of IP blocks representing all of the leaf networks (e.g., endpoint LAN's on the global Internet): BGP peering, harvesting information from network registration databases (e.g., RIPE, APNIC and ARIN), and random traceroutes into very large blocks (e.g., UUNET). The load on the CDN generated by each IP block may be determined by gathering and aggregating measurements from the CDN content servers. One or more different communication costs may be used to determine the cost of communication between an IP block and a CDN server region: network health of server region (e.g., a binary metric indicating that the region is up or down), ASPATH length between the block and the server region (e.g., as supplied by BGP), round trip time (RTT) between the region's mapping agent and a given point in the IP block, packet loss rate between the region's mapping agent and the given point in the IP block, geographic distance, and perhaps others. These metrics may be combined into a single cost metric for each IP block, server region pair, with the priority, or weighting, of each individual metric set to be proportional to its position on the list. Two types of capacity measurement are typically made: total server capacity in each region and physical network capacity in each region. The server capacity is determined from the number of servers currently up in a region. Physical network capacity is determined with packet pair measurements. Region capacity may be calculated as a given function (e.g., the minimum) of these two measurements.

The map associates each IP block to an optimal CDN server region. One technique for generating the map involves identifying a number of candidate regions for each IP block (e.g., based on the {IP block, server region} communication costs), generating a bipartite graph using all of the measured and collected network information (e.g., with one side of the graph representing each of the IP blocks and the other side representing CDN server regions), and then running a min-cost flow algorithm on the graph. Each IP block node is labeled with its measured load, which is treated as the "flow" coming from that node. Running the algorithm results in an optimal assignment of IP block load to server regions. This assignment is the map, which is generated periodically by the CDNSP and then delivered to the nameservers that respond to the client player queries.

Many of the functions have been described and illustrated above as discrete programs. One of ordinary skill will appreciate that any given function, alternatively, may comprise part of another program. Thus, any reference herein to a program should be broadly construed to refer to a program, a process, an execution thread, or other such programming construct. Generalizing, each function described above may be implemented as computer code, namely, as a set of computer instructions, for performing the functionality described via execution of that code using conventional means, e.g., a processor, a computer, a machine, a system, or other apparatus.

While the present invention has been described in the context of an RTSP stream-based protocol, one of ordinary skill in the art will appreciate that the functions and features described may also be used for other types of content. A particular example would be HTTP over TCP/IP, wherein the given content of interest is a large HTTP object. In such case, the various processes described above may be modified as appropriate to implement the described functionality. Thus, for example, the stream switch process would be modified to incorporate appropriate routines for handling the file switch. As in the stream-based embodiment, the code may be built into a browser, a plug-in, an applet, or other codebase.

Having thus described my invention, the following sets forth what I now claim.

I claim:

1. An apparatus, comprising:
   a processor;
   a media player;
   a program code module comprising code executable by the processor to carry out the following method steps:
   receiving a list of a set of servers, wherein the set of servers is identified by a content delivery network (CDN) map generating process;
   issuing a request to each of the set of servers and receiving a response to the request, and using data associated with the response from each of the set of servers to identify a given server in the set of servers;
   as a media stream is being received from a first server and rendered by the media player, determining whether the media stream is acceptable according to a given metric; if the media stream is not acceptable, and as the media stream continues to be received, taking a given action to initiate delivery of the media stream from the given server, wherein the given action includes the steps of: (a) creating a buffer; (b) receiving from the first server and caching in the buffer advanced portions of the media stream; (c) issuing a request to the given server to initiate delivery of the media stream at a given offset; and (d) rendering the advanced portions of the media stream;
   receiving the media stream from the given server; and
   when the given offset is reached, rendering in the media player the media stream received from the given server.

2. The apparatus as described in claim 1, wherein the code is executable by the processor to initiate an instruction to the first server to cease transmission of the media stream before rendering the advanced portions of the media stream.

3. The apparatus as described in claim 1, wherein the code is executable by the processor to match data packets received from the first server and the given server such that the media stream rendered in the media player appears continuous.

4. The apparatus as described in claim 1 wherein the media stream is not acceptable if it is being thinned by the first server.

5. The apparatus as described in claim 1 wherein the media stream is not acceptable if a given indication from the first server is received.

6. The apparatus as described in claim 5 wherein the given indication is that the first server will be unavailable.

7. The apparatus as described in claim 1, wherein the code executable by the processor determines that the given server has a response time that differs from a response time of at least one other server in the set of servers.

8. The apparatus as described in claim 1, wherein the code executable by the processor determines whether the media stream is acceptable periodically as the media stream is being delivered.

9. The apparatus as described in claim 1, wherein the code executable by the processor records given data associated with receipt of the media stream.

10. The apparatus as described in claim 1, wherein the advanced portions of the media stream are created by instructing the first server to increase a delivery rate of the media stream or by instructing the media player to decrease a rendering rate of the media stream.

11. The apparatus as described in claim 1 wherein the request is an RTSP OPTIONS command.

12. The apparatus as described in claim 1 wherein the request is associated with a DNS SRV protocol.

13. The apparatus as described in claim 1 wherein the method carried out by the program code constructs a header that identifies, for each of the set of servers, an IP address for the server, together with a value indicating a time for the response to be returned after issuing the request.

14. The apparatus as described in claim 13 wherein the method carried out by the program code transmits the header to the CDN map generating process to facilitate building of a map of Internet traffic conditions.

* * * * *